United States Patent
Fournie et al.

(10) Patent No.: US 12,269,615 B2
(45) Date of Patent: Apr. 8, 2025

(54) ENHANCED SUPPORT FOR THE MAINTENANCE OF AN AIRCRAFT RADOME

(71) Applicant: Airbus Operations SAS, Toulouse (FR)

(72) Inventors: Jacques Fournie, Toulouse (FR); Julien Poteau, Toulouse (FR); Noël Pernalon, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/602,536

(22) Filed: Mar. 12, 2024

(65) Prior Publication Data

US 2024/0308693 A1    Sep. 19, 2024

(51) Int. Cl.
| | |
|---|---|
| *B64F 5/40* | (2017.01) |
| *B23B 49/02* | (2006.01) |
| *B64C 1/36* | (2006.01) |
| *H01Q 1/42* | (2006.01) |

(52) U.S. Cl.
CPC ............ *B64F 5/40* (2017.01); *B23B 49/02* (2013.01); *B64C 1/36* (2013.01); *H01Q 1/42* (2013.01)

(58) Field of Classification Search
CPC ..... B64F 5/40; B64F 5/50; B64C 1/36; B23B 49/02; H01Q 1/42
See application file for complete search history.

(56) References Cited

FOREIGN PATENT DOCUMENTS

| CN | 203592383 U | * | 5/2014 | ............ B24B 27/06 |
| CN | 104858685 A | * | 8/2015 | ............ B23Q 3/062 |
| CN | 112091248 A | * | 12/2020 | ............ B23B 25/06 |
| CN | 112680865 A | * | 4/2021 | |
| CN | 215177389 U | * | 12/2021 | |
| CN | 216030375 U | * | 3/2022 | |

OTHER PUBLICATIONS

Shell clamping mechanism for replacing radome shell; Chen Huipeng; English Machine translation, pp. 1-7 (Year: 2022).*
French Search Report for corresponding French Patent Application No. 2302342 dated Oct. 31, 2023.

* cited by examiner

*Primary Examiner* — Bayan Salone
(74) *Attorney, Agent, or Firm* — Greer, Burns & Crain, Ltd.

(57) ABSTRACT

A support for the maintenance of an aircraft radome comprising an annular element having a flat surface and from which extend at least three feet. The support comprising a plurality of articulated holding elements, for example articulated fittings, applying a lock function and each comprising a bearing surface on a surface portion of an aircraft radome, for example an interface fitting, when said radome is placed on said flat surface of said annular element.

13 Claims, 2 Drawing Sheets

[Fig. 1]
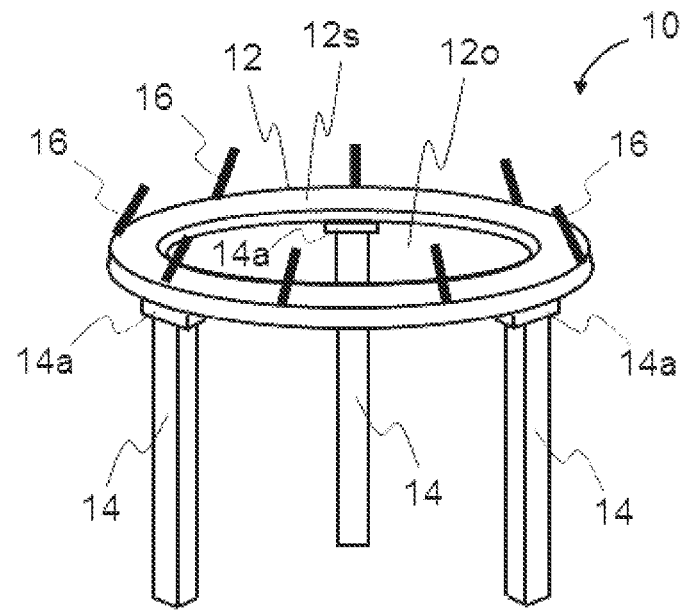
[Fig. 2]
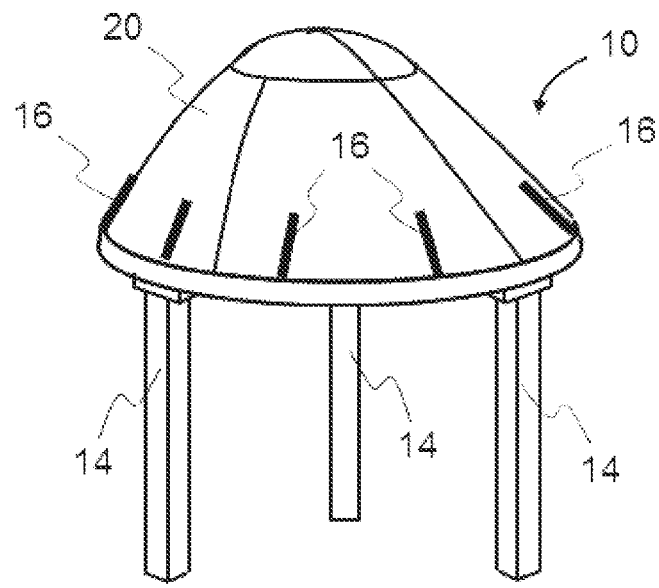

[Fig. 3]
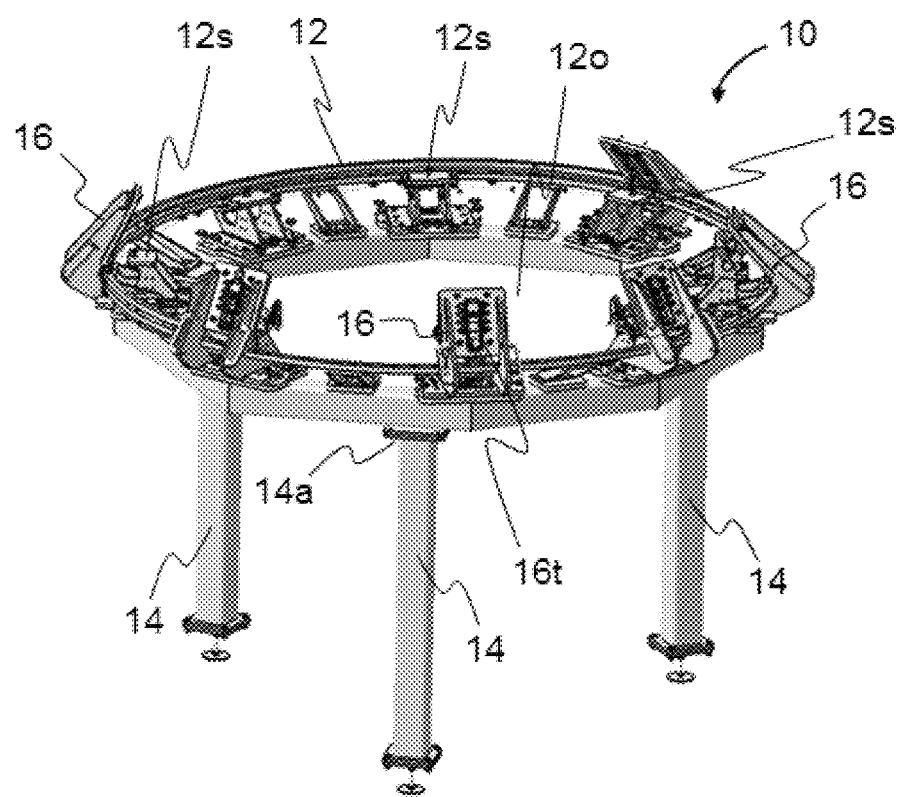

ENHANCED SUPPORT FOR THE MAINTENANCE OF AN AIRCRAFT RADOME

CROSS-REFERENCES TO RELATED APPLICATIONS

This application claims the benefit of French Patent Application No. 2, 302, 342 filed on Mar. 14, 2023, the entire disclosure of which is incorporated herein by way of reference.

FIELD OF THE INVENTION

The present invention relates to a tool intended for the repair of an aircraft radome. The invention relates notably to a tool allowing a fixing element of an aircraft radome to be changed and for its positioning on this radome to be changed while observing interchangeability tolerances.

BACKGROUND OF THE INVENTION

Many aircraft, including civil and military transport airplanes, comprise a radome installed at the front of the fuselage and forming a dome or a nose cone. The function of such a radome is to protect a radar-type device positioned at the front of the aircraft, while offering the aircraft good aerodynamic performance levels. Because of the presence of a radar under the radome, the latter must be produced in a material that is permeable to electromagnetic waves, for example an electrically insulating composite material.

The existing aircraft radomes are generally so-called "sandwich" constructions which entails manufacturing a rigid assembly having at least one shell, also called web, arranged between two skins, which makes it possible to significantly increase the flexural rigidity while offering good transparency to the electromagnetic waves, notably through adjustment of the thickness of the radome to the wavelength of the radar that is covered. The role of a web is to offer a support to the skins assembled together in order for the assembly to be able to absorb the bending forces, the web itself having shear strength characteristics. The form of the radomes, having a pronounced double curvature, entails manual assembly and the size of the petals of which it is composed is limited by the deformability of the fabric layouts used in light of the form of the support having this double curvature.

Thus, the radome is a fragile part which can be damaged rapidly in the event of an impact in flight or when the aircraft is taxiing on the ground. The absorption of the forces present upon an impact, such as, for example, a bird strike, is such that one or more fixing elements of the radome constituting precise points of interface with the front of the fuselage of the aircraft must be replaced, in addition to any repairs to be performed on the shell itself of the radome.

These maintenance operations require the use of a specific support, often called "egg cup" and which allows a radome to be inserted therein in a position according to which the tip of the radome is oriented downward.

While such equipment is configured to facilitate the maintenance operations with a high degree of accuracy, which allows the reconstruction of the points of interfaces with the fuselage of the airplane, it is generally available in a radome manufacturing shop of an aircraft manufacturer, which then means that the damaged radomes have to be transported there to be repaired there. Such transports present the drawback of resulting in both high transport costs and consequential downtimes, which is prejudicial to the operation of the aircraft.

The situation can be improved.

SUMMARY OF THE INVENTION

One object of the present invention is to propose a support that is lightweight and pliable or removable, configured for the maintenance of an aircraft radome, and which can easily be transported to be installed on a remote maintenance site where there are one or more radomes to be repaired.

To this end, a support is proposed for the maintenance of an aircraft radome comprising an annular element having a flat surface and from which extend at least three feet, preferentially adjustable, the support comprising a plurality of articulated and removable holding elements each comprising a bearing surface on an inner or outer surface portion of an aircraft radome when the radome is placed on said flat surface of the annular element.

Thus, it is possible to easily carry out positioning, drilling, cutting or more generally maintenance operations on the rear part (root fillet) of an aircraft radome, including by easily accessing the interior of the radome, and notably carrying out maintenance operations facilitated on the fixing elements for fixing the radome onto an aircraft fuselage, without having to send the radome to its manufacturing site.

The radome support according to the invention can further comprise the following features, considered alone or in combination:

All or part of the articulated holding elements are configured to have a bearing surface on the radome, of a form complementing the form of a portion of an aircraft radome, which radome has a predetermined form.

The number of articulated holding elements lies between five and ten preferentially eight.

Each of the feet comprises an attachment terminal part for attachment to said annular element, that can be locked in position.

At least one of the articulated holding elements comprises a drilling template or cutting template or is configured to support such a template.

The central opening of the annular element has a diameter greater than 60 cm, preferentially greater than 80 cm.

One or more of the feet of the radome support are detachable.

Also a subject of the invention is a method for maintenance of an aircraft radome comprising steps of positioning of an aircraft radome on a support as previously described, the rear part of the radome, comprising interface fittings, bearing on the flat surface of the annular element.

Advantageously, the method for maintenance of a radome further comprises a drilling or cutting operation using a template included in one of the articulated holding elements or positioned on one of these holding elements.

Also advantageously, the drilling or cutting operation of the above-mentioned maintenance operation comprises a positioning of an operator or of an equipment item in the opening of the annular element.

According to one embodiment, the maintenance method comprises:
  said positioning of said radome on said support,
  the fixing of said radome to said support using said radome interface fittings which are positioned and held in position by said articulated holding elements, an operation of drilling the repaired part of the skin of said radome using a drilling template included in one of the articulated holding elements which are positioned facing said repaired skin part, fixing of said replacement fitting using fixing means and using one or more drillings made during said drilling operation, According to one embodiment, the maintenance method further comprises, before said step of positioning the radome on the support, a step of removing a damaged fitting from the aircraft radome and a step of repairing part of the skin of said radome in a zone intended to comprise a replacement fitting that replaces said damaged fitting.

BRIEF DESCRIPTION OF THE DRAWINGS

The abovementioned features of the invention, and others, will become more clearly apparent on reading the following description of an exemplary embodiment, said description being given in relation to the attached drawings:

FIG. 1 schematically illustrates an aircraft radome support configured for the maintenance of a radome, according to an embodiment; and, FIG. 2 schematically illustrates the aircraft radome support already represented in FIG. 1 when an aircraft radome is held and positioned on top in order to perform one or more maintenance operations.

FIG. 3 illustrates in greater detail the radome support already represented in FIG. 1 and FIG. 2.

DETAILED DESCRIPTION OF EMBODIMENTS

FIG. 1 is a schematic representation of an aircraft radome support 10 according to an embodiment. The aircraft radome support 10 comprises an annular element 12. The annular element 12 has an annular form inasmuch as it has a circular or oval outer outline, or even a substantially circular or substantially oval outer outline, and a central opening 120. The annular element 12 also has a flat surface 12s configured to receive the rear edge of an aircraft radome. It is considered here that an aircraft radome has a generally pointed shell form, forming a dome, intended to be fixed to the front of the fuselage of an aircraft. The front of the aircraft radome is then here defined as the tip of the radome (or the summit of the dome), and therefore as the part furthest away from the fuselage elements of the aircraft to which the radome is fixed. On the other hand, the rear of the radome is defined as the part closest to the fuselage elements of the aircraft to which the radome is fixed. Thus, the rear edge of the radome here designates the edge describing a circle or an oval and delimiting the inner surface and the surface of a same radome. According to one embodiment, the flat surface 12s of the annular element 12 is not composed of a single flat surface but is composed of a set of small flat surfaces that are inscribed in a same plane. For example, flat surfaces offering a bearing at the rear of the radome are arranged on elements secured to the annular element 12, such as support lugs, for example. The annular element is supported by feet 14. According to one embodiment, the feet 14 each comprise an attachment terminal part 14a configured to be able to fold or detach the foot from the annular element 12 in order to facilitate the transportation of the radome support 10. According to a variant embodiment, some of the feet are foldable and other feet are detachable, by virtue of mechanical attachment means implemented in the attachment terminal parts 14a of the feet 14 of the aircraft radome support 10. According to another variant embodiment, all the feet 14 of the radome support 10 are detachable. Shrewdly, articulated and removable holding elements 16 are arranged along the outer edge of the annular element 12. The holding elements 16 are configured to be able to be each oriented outward from the annular element 12 or toward the interior of the annular element 12, in a radial direction with respect to the annular element 12. According to one embodiment, each of the articulated holding elements 16 has a bearing surface 16s of a form complementing a local form of an aircraft radome of a predetermined form, that is to say an aircraft radome for the holding of which the aircraft radome support 10 is provided and configured. The complementary form of the radome in question here is, for example, a form of a fitting fixed at the edge of the radome. Such a local form of an aircraft radome is for example a form of an interface fitting complementing a fitting of articulated lock type. The set of the bearing surfaces on the surface of the radome allows an accurate positioning of an aircraft radome 20 for the positioning of which the aircraft radome support 10 is configured.

According to one embodiment, each of the surfaces 16s has a through-opening, which may or may not be threaded, into which there may be inserted a screw which is configured to also be inserted into a threaded opening in a fitting of the radome when this fitting is positioned and held bearing against a bearing surface 16s.

Advantageously, if a fixing element of an aircraft radome 20 must be repaired or replaced, the holding elements 16, operating as a positioning template, make it possible to apply an accurate and fitted positioning of the aircraft radome 20 and to provide, if necessary, a drilling or cutting template 16t for a maintenance operation aiming to repair a radome support of the radome 20. The fact that the holding elements 16 are articulated allows space above the radome support 10 to be freed up in order to apply a placement of the radome on the surface or surfaces 12s intended to accommodate the radome for which maintenance operations are required, and then, to place each of the holding elements 16 in contact with the surface of the radome, which advantageously makes it possible to apply an accurate positioning. Shrewdly, the aircraft radome support 10 makes it possible to easily access the various zones (or portions) of the radome 20, and at the same time apply positioning template functions to offer accurate markers, notably for the fitted positioning of mechanical fixing elements for fixing the radome to an aircraft fuselage.

FIG. 2 illustrates an accurate positioning of the aircraft radome 20 on the aircraft radome support 10 configured to receive it in a position suited to maintenance operations. For example, if a fixing element secured to the aircraft radome 20 has to be replaced, it can be removed (dismantled) from the aircraft radome 20, then remounted on the aircraft radome 20 after the latter has been placed on the aircraft radome support 10, in a position according to which each of the fixing elements remaining on the aircraft radome 20 is positioned facing one of the remaining articulated holding elements that are present, before the placement of the replacement fixing element.

Advantageously, the radome support 10 can be used for any aircraft radome maintenance method after the positioning of the radome concerned bearing on the flat surface or surfaces 12s of the annular element 12. That notably makes it possible to facilitate a drilling or cutting operation, for example using a template included in one of the articulated holding elements 16 or positioned on one of these holding elements.

Advantageously, the opening 120 of the annular element 12 has a diameter greater than 60 cm to allow an insertion of an automated or robotized mechanical tool configured to intervene inside the radome. According to one embodiment, the opening 120 has a diameter greater than 80 cm, which also allows an operator to have access to the interior of the radome for maintenance, testing or inspection operations for example.

According to one embodiment, the holding elements 16 are articulated fittings, also called "locks" configured to be attached to the radome fixing interface fittings, which are then arranged on the inner surface of the radome. According to this configuration, the articulated fittings (locks), that are the holding elements 16, reproduce at least functionally, if not fully, the features of the articulated fittings (also called "locks") for fixing the radome arranged on the fuselage of the aircraft with which the radome is associated (combined). Furthermore, the bearing surface of the radome on which a holding element 16 bears, taking the form of an articulated fitting, is a surface of an internal fitting of the radome configured to be hooked onto an articulated fitting (lock) forming a holding element 16. Still according to this configuration, the articulated fittings which form the holding elements 16 have forms complementing the forms of the radome fixing interface fittings, so as to allow the hooking and locking functions useful to the fixing of the radome on the front part of the fuselage of the aircraft with which it is combined.

According to a preferred embodiment, eight articulated and removable locks are positioned on the annular element 12 of the radome support 10, by strictly reproducing the angular positioning of the radome fixing locks arranged at the front of the fuselage of the aircraft and intended to fix the radome on the aircraft. Thus, the locks of the radome support tool 10 can be hooked onto the fittings of a radome positioned on the radome support tool 10 and offer a reference positioning in such a way as to make it possible to repair or replace a defective fitting and/or lock, after a possible repair of the shell of the radome, if necessary. Advantageously, the radome support 10 makes it possible to pre-stress the radome to shape it as on the aircraft with which it is combined. Indeed, the shell of the radome, although overall rigid, has a certain degree of flexibility. Thus, when a fitting is placed on the radome in the context of a repair, it will be so placed correctly and accurately.

The shrewd structure of the radome support 10 makes it possible to easily transport it, and consequently be able to perform maintenance operations on a radome without having to transport the latter, which advantageously makes it possible to lessen the cost of the maintenance operations on the aircraft radomes.

FIG. 3 illustrates details of the radome support 10 according to one embodiment. According to this embodiment, the flat surface 12s of the annular element 12 is not made up of a single flat surface but is made up of a set of small flat surfaces 12s lying in the one same plane. These flat surfaces 12s are each arranged on part of an articulated holding element 16 which is itself arranged on the annular element 12, which holding element is configured to perform positional guidance (or accurate positioning in other words) of an aircraft radome on the radome support with a view to performing a maintenance operation on the radome.

In addition, each of these flat surfaces 16s has a through-opening into which a screw can be inserted to accurately position a fitting of the aircraft radome and hold it in position (i.e. fix it) on (against) said flat surface 16s. According to one embodiment, such a screw is a serrated screw that can be tightened by hand or using a tool. According to one embodiment, such a serrated screw can be inserted through each of the bearing surfaces 16s, from the top downwards, to be screwed also into a radome fitting so that the head of the screw bears against the underside of the element exhibiting the bearing surface 16s.

Advantageously, such a configuration allows the articulated holding elements 16 to be used to hold the radome in a predetermined precise position and therefore guarantee correct shaping of the radome which, on account of its structure, does exhibit a certain amount of flexibility.

Advantageously, each of the articulated holding elements 16 further comprises a drilling or cutting template 16t which then allows a drilling or cutting operation to be performed at the precise location where it is required in order to fix a replacement fitting to a part of the radome skin that has been repaired after having become damaged.

According to one embodiment, the radome support 10 has eight articulated holding elements 16 of which the angular positioning on the annular element 12 is identical to the angular positioning of the holding elements present on an aircraft. Thus, if a radome fitting becomes damaged and needs to be replaced, seven of the eight articulated holding elements 16 of the support 10 can be used to accurately position, hold and shape the radome on the support 10, using serrated screws with which seven of the bearing surfaces 16s are provided, thus making it possible to maintain correct shaping of the radome while it is in the process of being repaired, something which will then allow accurate drilling or cutting operations using a template 16t included in the eighth holding element 16 or else assembled therewith.

In summary, according to one embodiment, each of the holding elements 16 comprises a bearing surface 16s provided, on the one hand, with a means of attachment to a fitting of a radome, such as a serrated screw for example, and, on the other hand, with a drilling or cutting template or with means for accepting such a drilling or cutting template.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A support for maintenance of an aircraft radome comprising:
    an annular element having a flat surface, and from which extend at least three feet; and
    a plurality of articulated and removable holding elements each comprising a bearing surface on a surface portion of an aircraft radome when said radome is placed on said flat surface of said annular element,
    wherein at least one of the articulated and removable holding elements comprises a drilling template or cutting template or is configured to support such a template.

2. The support as claimed in claim 1, wherein some or each of the articulated and removable holding elements of the plurality are configured to have a bearing surface on said aircraft radome complementing a form of a portion of the aircraft radome, wherein the aircraft radome has a predetermined form.

3. The support as claimed in claim 1, wherein a number of articulated and removable holding elements is between five and ten.

4. The support as claimed in claim 1, wherein a number of articulated and removable holding elements is eight.

5. The support as claimed in claim 1, wherein each of the at least three feet comprises an attachment terminal part for attachment to said annular element and which are configured to be locked in position.

6. The support as claimed in claim 1, wherein a central opening of the annular element has a diameter greater than 60 cm.

7. The support as claimed in claim 1, wherein one or more of said at least three feet are detachable.

8. The support as claimed in claim 1, wherein the articulated and removable holding elements are articulated fittings configured to apply lock functions in combination with interface fittings of a radome.

9. The support as claimed in claim 8, wherein the articulated and removable holding elements comprise articulated fittings respectively arranged to each apply a lock function in combination with an interface fitting arranged on an inner surface of said radome.

10. A method for maintenance of an aircraft radome, comprising:
    positioning the aircraft radome on a support, the support comprising an annular element having a flat surface, from which extend at least three feet, and a plurality of articulated and removable holding elements each comprising a bearing surface on a surface portion of the aircraft radome when said aircraft radome is placed on said flat surface of said annular element,
    wherein a rear part of the aircraft radome, comprising interface fittings, bears on said flat surface of said annular element, and
    wherein at least one of the articulated and removable holding elements comprises a drilling template or cutting template or is configured to support such a template.

11. The method as claimed in claim 10 further comprising:
    fixing of said aircraft radome to said support using said interface fittings which are positioned and held in position by said articulated and removable holding elements;
    drilling a repaired part of a skin of said aircraft radome with a drilling template included in one of the articulated and removable holding elements which are positioned facing said repaired part, and,
    fixing of a replacement fitting with fixing means and one or more drillings made during said drilling.

12. The method as claimed in claim 11 further comprising:
    before positioning the aircraft radome, removing a damaged fitting from the aircraft radome and repairing part of the skin of said aircraft radome in a zone comprising a replacement fitting that replaces said damaged fitting.

13. A support for maintenance of an aircraft radome, comprising:
    an annular element having a flat surface, and from which extend at least three feet, wherein one or more of said at least three feet are detachable; and
    a plurality of articulated and removable holding elements each comprising a bearing surface on a surface portion of an aircraft radome when said radome is placed on said flat surface of said annular element.

* * * * *